J. W. FREEMAN.
LUBRICATING MECHANISM.
APPLICATION FILED AUG. 13, 1919.
1,332,120.  Patented Feb. 24, 1920.
2 SHEETS—SHEET 1.
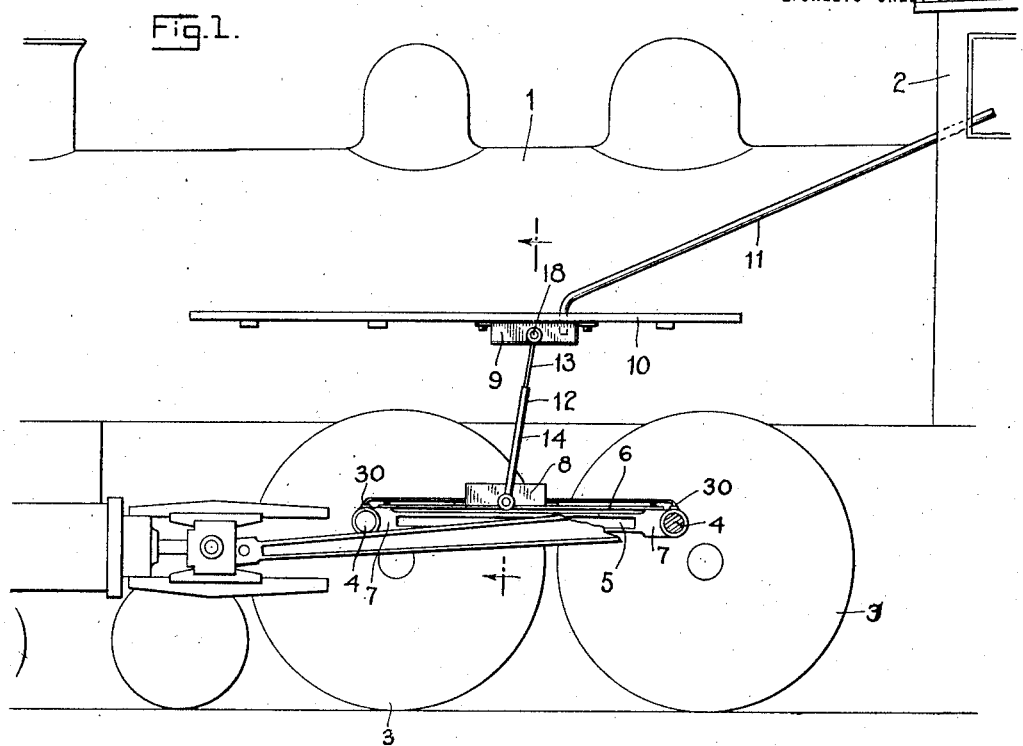
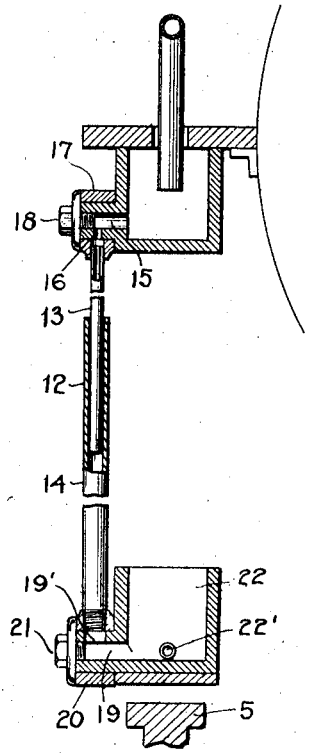
WITNESSES
INVENTOR
J. W. Freeman
BY
ATTORNEYS

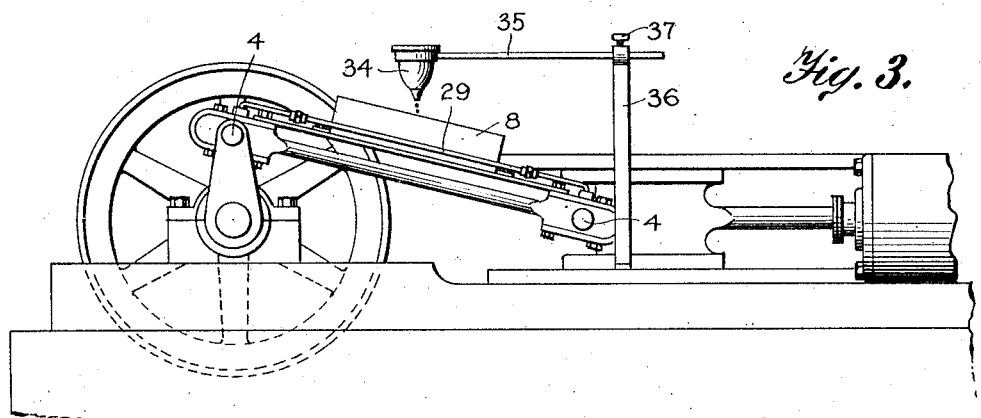
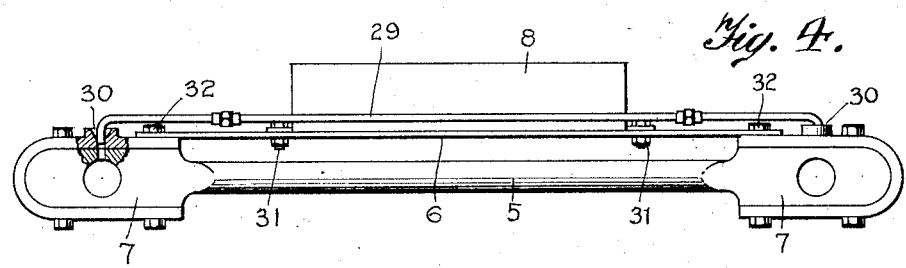
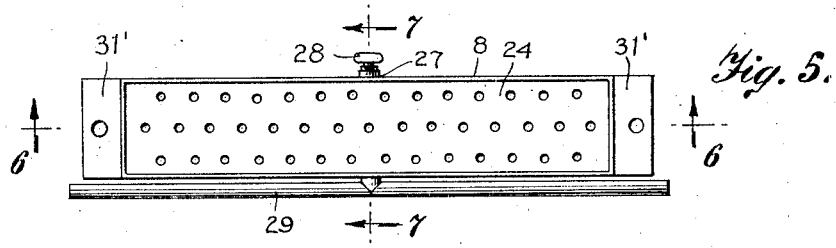
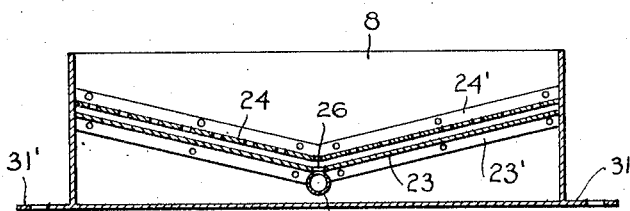
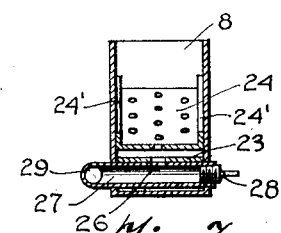

UNITED STATES PATENT OFFICE.

JOHN WILK FREEMAN, OF MONTICELLO, GEORGIA, ASSIGNOR OF ONE-HALF TO W. E. KING, OF HILLSBORO, GEORGIA.

LUBRICATING MECHANISM.

1,332,120.  Specification of Letters Patent.  Patented Feb. 24, 1920.

Application filed August 13, 1919. Serial No. 317,234.

*To all whom it may concern:*

Be it known that I, JOHN W. FREEMAN, a citizen of the United States, and a resident of Monticello, in the county of Jasper and State of Georgia, have invented a new and Improved Lubricating Mechanism, of which the following is a full, clear, and exact description.

This invention relates to improvements in lubricating mechanisms, and more particularly to a means for lubricating the bearings of connecting rods for engines either of the stationary or locomotive type, an object of the invention being to provide an improved construction and mounting for a lubricant feed box which is carried by the rod or other movable member and which is cushioned so as to absorb vibrations.

A further object is to provide a lubricant feed box having an improved arrangement of outlet pipe coöperating with an inclined bottom and a perforated screen, whereby a constant feed of lubricant is had and the latter kept free from foreign particles which would injure the bearings.

A further object is to provide a lubricating mechanism which may be utilized on a locomotive and which enables the engineer in his cab to keep it supplied with lubricant as occasion may require.

With these and other objects in view, the invention consists in certain novel features of construction, and combinations and arrangements of parts, as will be more fully hereinafter described and pointed out in the claims.

In the accompanying drawings—

Figure 1 is a diagrammatic view in side elevation of a locomotive illustrating my improvements in connection therewith;

Fig. 2 is a view in section on an enlarged scale, on the line 2—2 of Fig. 1;

Fig. 3 is a view in side elevation illustrating a slightly modified form of my invention adapted for use on a stationary engine;

Fig. 4 is a view in side elevation of the connecting rod provided with the improved lubricant feed box thereon;

Fig. 5 is a top plan view of the feed box;

Fig. 6 is a view in longitudinal section on the line 6—6 of Fig. 5; and

Fig. 7 is a view in transverse section on the line 7—7 of Fig. 5.

Referring particularly to the Figs. 1 and 2, 1 represents a locomotive, 2 the cab thereof, 3, 3 the driving wheels having crank pins 4 thereon and a connecting rod 5 on the crank pins. A metal strap 6 is secured at its ends to the enlarged ends 7 of the connecting rod, but throughout the greater portion of its length is spaced from the connecting rod, as clearly shown, so that it provides a yielding or elastic support for the lubricant feed box 8 which is secured thereon.

A supply reservoir 9 is secured to the running board 10 of the locomotive, and a pipe 11 discharges into the reservoir 9 and at its inlet end is located within the cab 2 so that the engineer can supply the lubricant as desired. A tubular conveyer 12 connects the reservoir 9 with box 8 and consists of two telescoping tubes 13 and 14, the former having a collar 17 at its upper end having oscillating engagement on a tubular outlet 15 projecting laterally from the reservoir 9 and closed by a headed screw threaded plug 18 which also holds the collar 17 in position. The tubular outlet 15 has a discharge orifice 16 registering with the end of tube 13.

The feed box 8 is made with a laterally projecting tubular inlet 19 receiving a collar 20 thereon fixed to the lower end of tube 14, and a headed screw plug 21 closes the outer end of the inlet 19 and holds the collar 20 in position. The tubular inlet 19 has an orifice 19' in its upper portion registering with the end of tube 14. The telescoping tubular conveyer 12 has an oscillating movement as the connecting rod reciprocates or moves in its ordinary operation and insures a perfect feed of lubricant in all positions.

The details of construction of the feed box 8 are shown most clearly in Figs. 4, 5, 6 and 7, in which it will be seen that an inclined or trough-like bottom 23 is located within the box 8 and secured in position by means of flanges 23' secured to the walls of the box.

A perforated screen plate 24 is located slightly above the bottom 23, is of the same general shape as the bottom 23, and is secured by side flanges 24' to the box. A relatively short transverse outlet pipe 27 is located under the bottom 23, and said pipe 27 and bottom 23 have registering orifices 26 which permit the lubricant to enter the pipe 27. One end of this pipe 27 outside of the box 8 is normally closed by a screw plug 28, while the other end of the pipe 27 outside of the box 8 communicates with a longitudinal pipe 29 discharging at its ends into the lubricant inlets 30 of the connecting rod 5. The box 8 has perforated flanges 31' at its ends which are removably secured to the strap 6 by bolts 31, and screws 32 removably secure the ends of strap 6 to the enlarged end 7 of connecting rod 5.

In Fig. 3 where my improvements are illustrated in connection with a stationary engine, I preferably supply lubricant to the box 8 by means of a drip cup 34 secured on the end of a rod 35 held in an upright 36 by means of a set screw 37.

It is to be understood that, if desired, ordinary waste or other similar retarding means can be placed in the box 8 to retard the flow of lubricant and to prevent the passage of grit through the screen plate 24.

I would have it understood that in the employment of the term "connecting rod" I use this term broadly to include any movable member which needs lubrication.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. The combination with a connecting rod, a strap secured at its ends to the connecting rod and between its ends spaced from the rod, a lubricant receptacle on the strap, and means independent of the strap for conveying lubricant from the receptacle to the bearings in the ends of the connecting rod.

2. The combination with a connecting rod, a metal strap secured at its ends to the connecting rod and at its intermediate portion spaced from the rod, a lubricant feed box secured on the intermediate portion of the strap, outlet pipes connecting the box with the bearings of the connecting rod, an inclined bottom in the box communicating with said pipes, and a perforated screen above the bottom.

3. The combination with a connecting rod, of a strap on the rod, a lubricant feed box secured on the strap, a transverse outlet pipe in the bottom portion of the box, a longitudinal pipe communicating with the transverse pipe and at its discharge ends communicating with the bearings of the connecting rod, a removable plug closing one end of the transverse pipe, and an inclined bottom in the box having an outlet discharging into the transverse pipe.

4. A lubricating mechanism of the character described, comprising a connecting rod, a strap thereon, a lubricant feed box on the strap, outlets for the feed box communicating with the bearings of the connecting rod, and means for directing lubricant into the box.

5. The combination with a locomotive, and a connecting rod thereon, of a strap secured at its ends to the connecting rod and between its ends spaced from the connecting rod, a lubricant feed box on the intermediate portion of the strap, a lubricant reservoir secured to a fixed part of the locomotive, a conveyer tube comprising telescoping pipes, one of said pipes having pivotal connection with the reservoir, and the other of said telescoping pipes having pivotal connection with the feed box.

6. The combination with a locomotive, and a connecting rod thereon, of a strap secured at its ends to the connecting rod and between its ends spaced from the connecting rod, a lubricant feed box on the intermediate portion of the strap, a lubricant reservoir on a fixed part of the locomotive, said reservoir and feed box having laterally projecting tubular extensions, a conveyer tube comprising telescoping pipes, a collar on one of the telescoping pipes fitting the tubular extension of the reservoir, a collar on the other telescoping pipe fitting the tubular extension of the feed box, and screw threaded plugs in the ends of said extensions holding the collars thereon.

7. The combination with a locomotive, and a connecting rod thereon, of a strap secured at its ends to the connecting rod and between its ends spaced from the connecting rod, a lubricant feed box on the intermediate portion of the strap, a lubricant reservoir on a fixed part of the locomotive, said reservoir and feed box having laterally projecting tubular extensions, a conveyer tube comprising telescoping pipes, a collar on one of the telescoping pipes fitting the tubular extension of the reservoir, a collar on the other telescoping pipe fitting the tubular extension of the feed box, screw threaded plugs in the ends of said extensions holding the collars thereon, and a supply pipe communicating with the reservoir and having its inlet end in the cab of the locomotive.

JOHN WILK FREEMAN.